(12) United States Patent
Sorg et al.

(10) Patent No.: US 7,755,220 B2
(45) Date of Patent: Jul. 13, 2010

(54) POWER STEALING FOR A THERMOSTAT USING A TRIAC WITH FET CONTROL

(75) Inventors: Scott A. Sorg, Fort Wayne, IN (US); Timothy N. Comerford, Indianapolis, IN (US); Donald R. Means, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 823 days.

(21) Appl. No.: 11/659,611

(22) PCT Filed: Feb. 24, 2005

(86) PCT No.: PCT/US2005/005844

§ 371 (c)(1),
(2), (4) Date: Feb. 6, 2007

(87) PCT Pub. No.: WO2006/022838

PCT Pub. Date: Mar. 2, 2006

(65) Prior Publication Data

US 2007/0296280 A1    Dec. 27, 2007

Related U.S. Application Data

(60) Provisional application No. 60/600,956, filed on Aug. 11, 2004.

(51) Int. Cl.
*G05D 23/00* (2006.01)
(52) U.S. Cl. .......................... 307/125; 307/130; 307/131
(58) Field of Classification Search ................. 307/125, 307/130, 131
See application file for complete search history.

(56) References Cited

U.S. PATENT DOCUMENTS

| 4,211,362 | A | | 7/1980 | Johnson |
| 5,192,874 | A | * | 3/1993 | Adams ........................ 307/125 |
| 5,198,809 | A | | 3/1993 | Day |
| 5,226,591 | A | | 7/1993 | Ratz |
| 5,736,795 | A | * | 4/1998 | Zuehlke et al. ............... 307/130 |
| 5,903,139 | A | * | 5/1999 | Kompelien ................. 323/282 |
| 2002/0074865 | A1 | | 6/2002 | Zimmerman et al. ........ 307/125 |
| 2002/0181251 | A1 | * | 12/2002 | Kompelien ................... 363/17 |
| 2003/0090243 | A1 | * | 5/2003 | Atherton ...................... 323/239 |
| 2007/0296280 | A1 | * | 12/2007 | Sorg et al. ................... 307/651 |
| 2010/0026379 | A1 | * | 2/2010 | Simard et al. ............... 327/540 |

* cited by examiner

*Primary Examiner*—Fritz M Fleming
(74) *Attorney, Agent, or Firm*—Marjama Muldoon; Blasiak & Sullivan LLP

(57) ABSTRACT

An electronic thermostat circuit has improved power stealing for controlling an AC control device. The circuit comprises a source of AC control power coupled to an electronic switch means having an electronic switch means control input. The electronic switch means controls the AC control device. The diode bridge controls the electronic switch means by a DC control signal applied to the diode bridge means DC connection. The amplifier means has an amplifier input for controlling the state of the amplifier and an amplifier output for generating the DC control signal. An isolated gate FET means is electrically coupled to the amplifier input for controlling the state of the amplifier. The isolated gate FET means is powered by the current derived from the source of AC control power by power stealing. The digital signal controls the state of the AC control.

14 Claims, 5 Drawing Sheets

POWER STEALING FOR A THERMOSTAT USING A TRIAC WITH FET CONTROL

FIELD OF THE INVENTION

This invention relates to an electronic thermostat output control circuit to improve power stealing, and more particularly to a circuit topology to minimize the power needed to control thermostat outputs.

BACKGROUND OF THE INVENTION

Electronic thermostats can be used to control the temperature in a building space as part of the building's heating, ventilation and air conditioning ("HVAC") system. Thermostats typically receive temperature information from one or more temperature sensors. While simple thermostats react to the sensor inputs using only analog circuits, most modern thermostats run a microcontroller program or algorithm. The algorithm determines when the various devices controlled by the thermostat should be turned on or off based on the temperature data. Thus, thermostats function as switches to control devices such as furnaces, blowers, motors, and compressors. Rather than switching the full device load current, the controlled devices are typically switched through intermediate controls such as relays or solid state switches.

A thermostat is typically placed in or near the space where it is to control the temperature. A minimal number of wires are run from the thermostat's location to the location or locations of the various devices controlled by the thermostat. The most common configuration is to run a single control wire for each device with a common return wire for all of the device controls. Typically the control power for this circuit is 24 VAC provided by a control transformer.

Thermostat electronics circuitry can be powered by a local power source such as a battery. In addition, parts of the control circuitry can be powered by trickling some small amount of current from the control circuit using "power stealing", that is drawing a relatively small amount of power from a device control line without actually switching the device on. One problem is to minimize the amount of power stealing so as to avoid a false switching of the device being controlled by that line. Another problem is that even with power stealing, there can still be significant battery drain by the output electronic circuits in the thermostat that controls the switching of each device controlled by the thermostat.

Accordingly there is a need for an electronic thermostat circuit topology that can minimize the current needed to control thermostat outputs.

SUMMARY OF THE INVENTION

An electronic thermostat circuit has improved power stealing for controlling an AC control device. The circuit comprises a source of AC control power coupled to an electronic switch means having an electronic switch means control input. The electronic switch means controls the AC control device. A diode bridge means has an AC connection and a DC connection. The AC connection is electrically coupled to the electronic switch means control input. The diode bridge controls the electronic switch means by a DC control signal applied to the diode bridge means DC connection. An amplifier means has an on state and an off state. The amplifier means is electrically coupled to the diode bridge means DC connection. The amplifier means has an amplifier input for controlling the state of the amplifier and an amplifier output for generating the DC control signal. An isolated gate FET means is electrically coupled to the amplifier input for controlling the state of the amplifier. The isolated gate FET means is further electrically coupled to a digital input signal. The digital input signal controls the state of the DC amplifier means. The isolated gate FET means is powered by the current derived from the source of AC control power by power stealing. The digital signal controls the state of the AC control.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention and are not necessarily drawn to scale.

In the schematic diagrams, unless otherwise stated, an upward pointing triangle represents a DC power supply, a sideways triangle (left or right) represents a circuit connection and a downward pointing triangle represents an electronic circuit common. A circle with a slash represents an electrical terminal (such as a binding point comprising a screw and threaded plate to hold an attached captive wire) and can be used as a circuit connection.

DETAILED DESCRIPTION OF THE INVENTION

Figure 1:
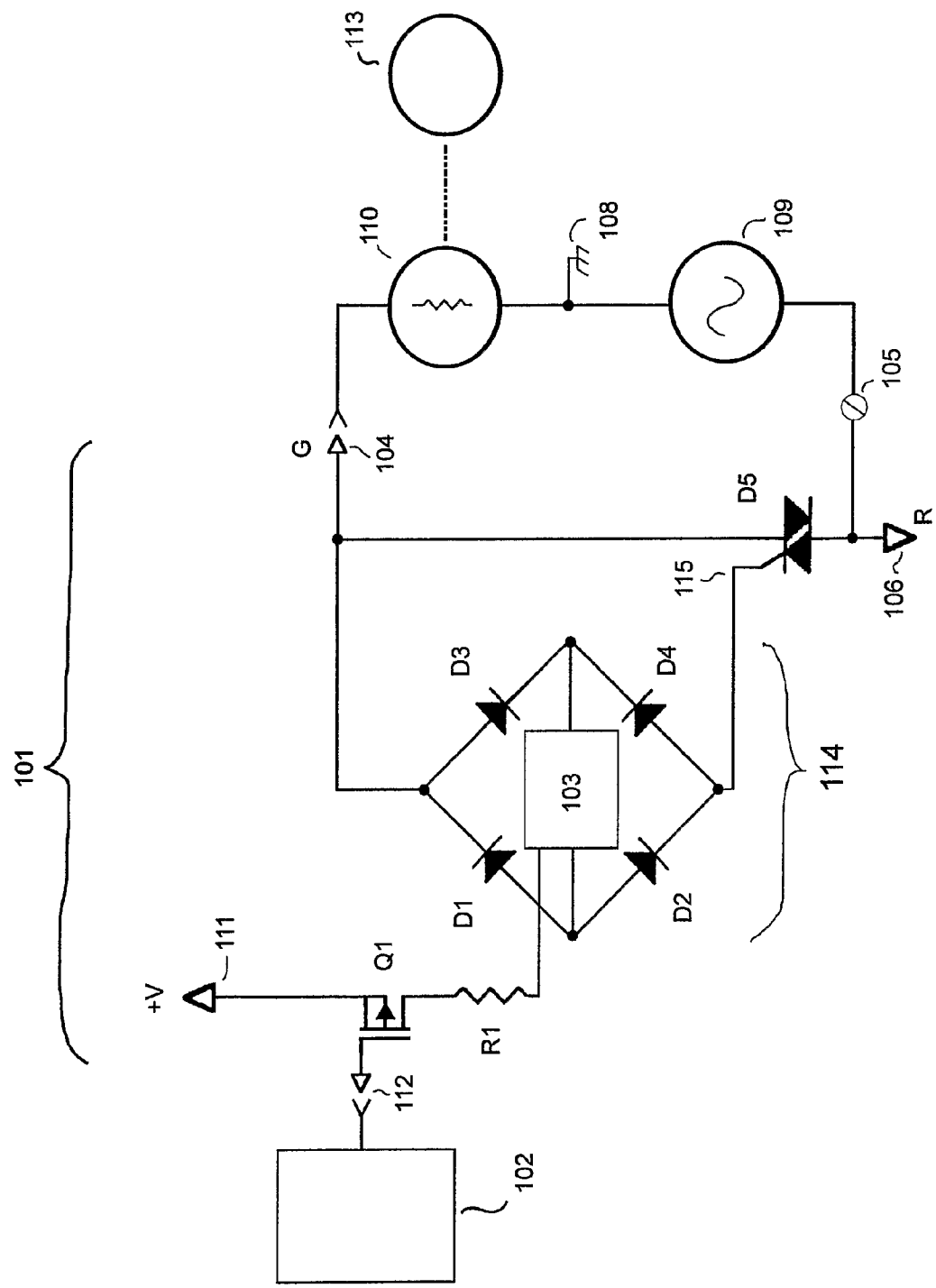
FIG. 1 shows the inventive circuit topology.

FIG. 1 shows the inventive thermostat output circuit topology. Circuit 101 shows the inventive thermostat output for controlling a device turned on or off by AC control 110. Each system device 113, such as a furnace or compressor, is controlled by a respective AC control 110. AC control 110 can be a relay coil or solid state switch or other type of AC operated system device control. AC power source 109 provides the AC power to switch a device control represented by AC control 110. FIG. 1 shows a single thermostat output for controlling one system device 113. An electronic switch with a control input, such as TRIAC D5 controlled by gate 115 can switch AC control 110. Typical thermostats comprise a plurality of such outputs, for controlling system devices 113 such as fans, compressors, furnaces, etc.

Thermostat microcontroller 102 signals the thermostat output to change the on or off condition of the system device 113 as controlled by AC control 110. Isolated gate FET Q1 is controlled by microcontroller ("μC") 102 via a connection made at the Gate of Q1 at connection point 112. Connection point 112 can be a wire such as a trace on a PC board or a connector. Connection points are shown by left or right pointing arrows. Because Q1 is an isolated gate FET, such as an enhancement mode FET, the DC current supplied by DC source +V 111 to maintain the Gate of switch Q1 in its switched state is on the order of microamps, or more typically nanoamps. When Q1 is switched on by μC 102 it provides control current through R1 to cause amplifier switch 103 to be on. Amplifier 103 can be a composite Darlington transistor topology or equivalent DC electronic switch as known in the art. Amplifier switch 103 requires only a small current on the order of microamps to cause it to turn on. Thus it can be seen that the Q1 drain current is on the order of tens of microamps. Resistor R1 can further limit the control current provided by FET Q1 to only that current needed to reliably turn on amplifier switch 103. Diodes D1 through D4 are wired in a diode bridge 114 configuration. By its connection to the DC connection of bridge 114, when amplifier switch 103 is turned on, AC current can flow through the AC connection of bridge 114 and the gate 115 of TRIAC D5, thus powering TRIAC D5 on and energizing the respective control load 110 via connections 104 and 105. Note that connections such as 104 and 105 can be interchangeably represented on the schematic diagrams as side facing arrows or a circle with a slash line representing a screw terminal.

Except for the tens of microamps supplied by FET Q1 to control amplifier switch 103, all other DC and AC power for controlling TRIAC D5 and the respective control load 110 comes from AC power source 109. It can now be seen that by using this thermostat output circuit topology, power source +V 111 requires only tens of microamps per output channel to energize a particular system device 113 via its respective AC control 110. And, when the system device 113 is to be controlled to its off state, virtually no current is required from +V 111 in holding FET Q1 off, where both the Q1 gate current and Q1 drain current are near zero.

Figure 2:
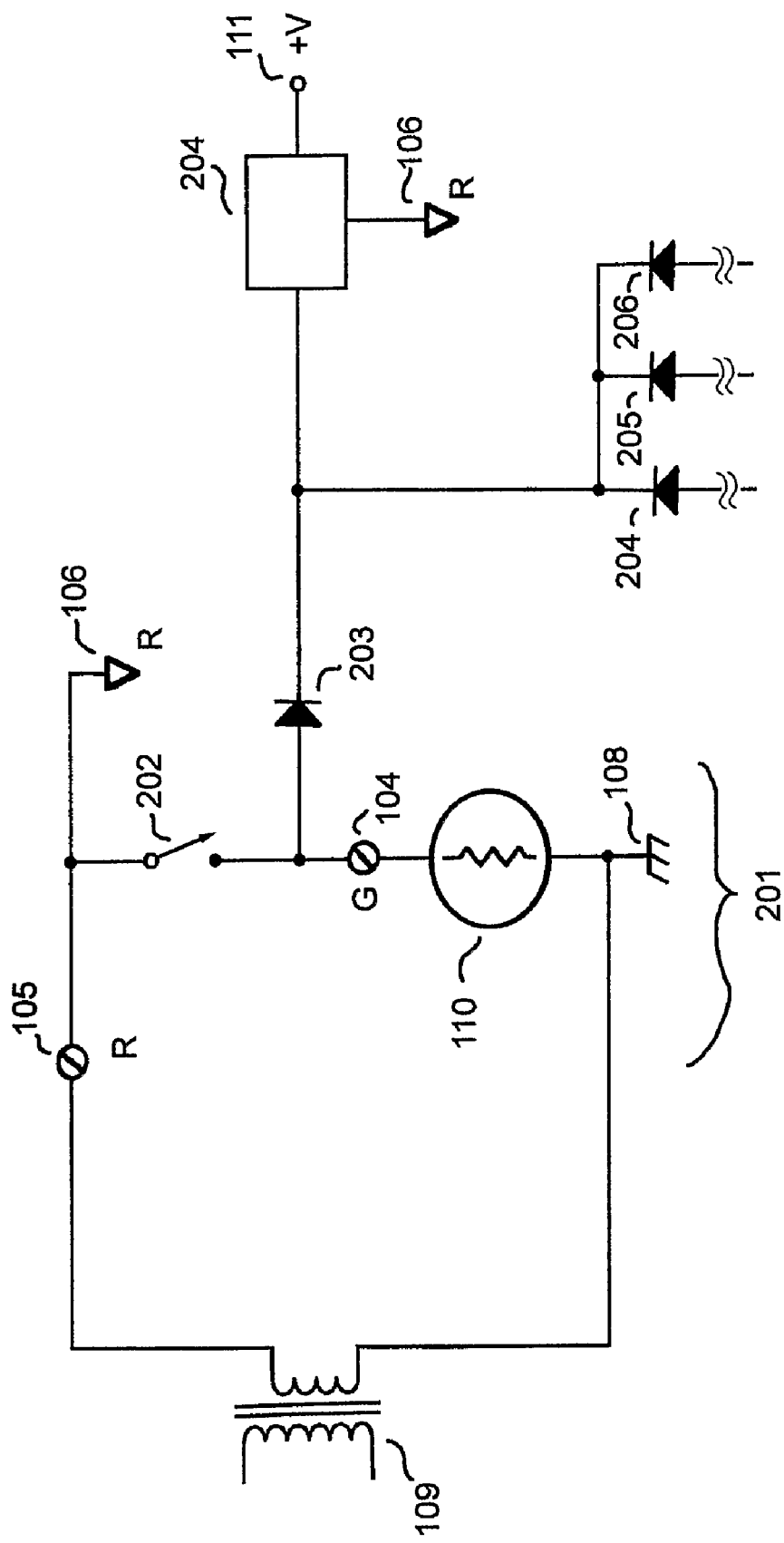
FIG. 2 shows a typical thermostat switch circuit with power stealing (prior art)
Figure 3:
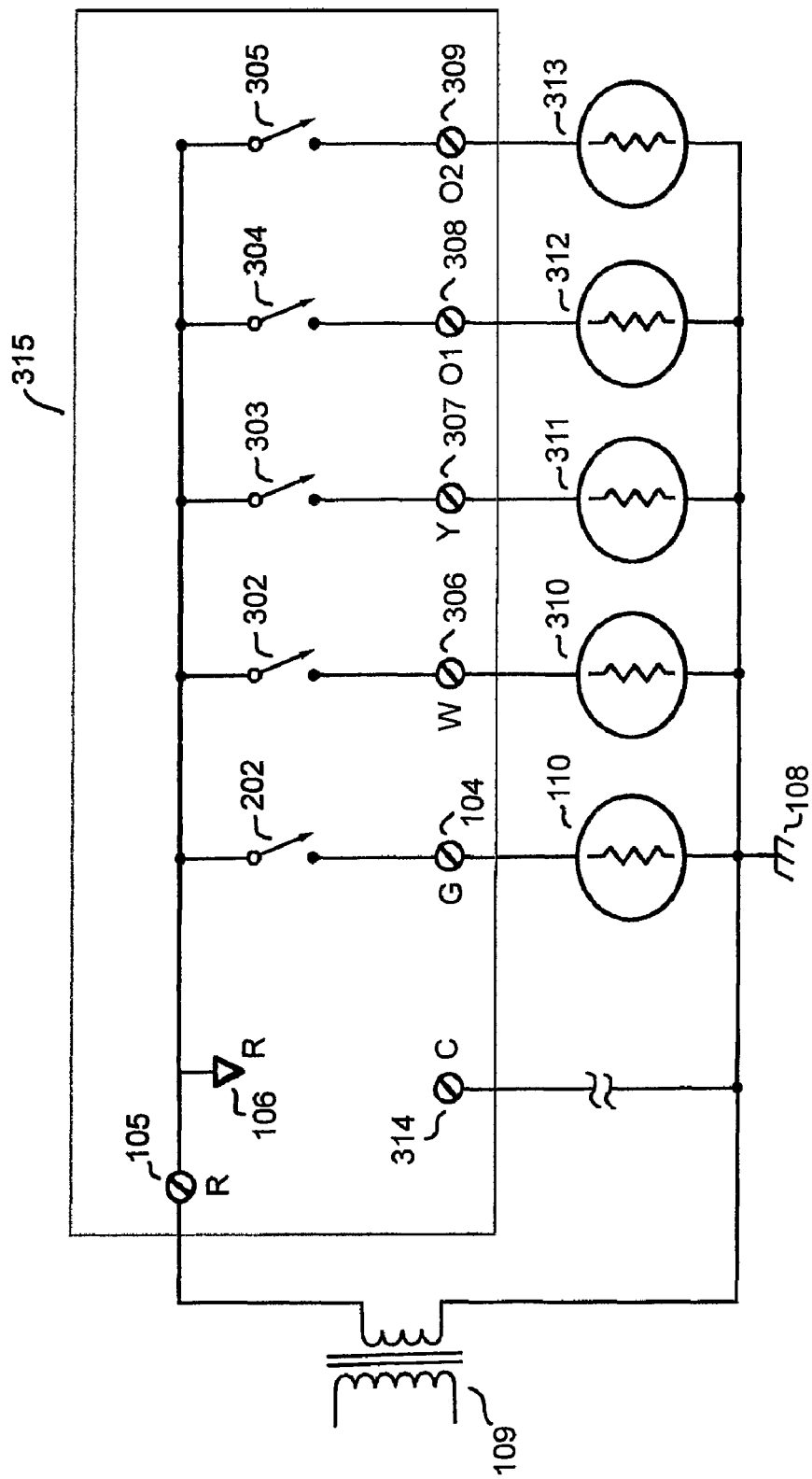
FIG. 3 shows a typical thermostat with a plurality of output circuits (prior art)

Another technique of thermostat power stealing was described in "Power Supply for Electronic Thermostat", U.S. Pat. No. 6,205,041 issued Mar. 20, 2001. U.S. Pat. No. 6,205,041 is incorporated by reference herein. FIGS. 2-3 show typical electronic thermostat output configurations using power stealing.

FIG. 2 is a simplified diagram showing electronic thermostat power stealing. AC power source 109 activates AC control 110 when switch 202 closes. AC control 110 is electrically referenced to AC common 108, while the electronic circuit of the thermostat is referenced to thermostat electronics common 106. Switch 202 can be a mechanical switch, relay contact, solid state switch contact, or a semiconductor switch, such as a TRIAC. Power stealing can occur when switch 202 is open. One such way to power steal is through diode 203, passing a rectified current to regulator 204 with a return current path through electronics common 106. (Standard filter capacitors are not shown for simplicity.) In this way potential +V 111 can be created by power stealing. Most thermostats typically include a plurality of controlled outputs 201. Since power stealing from each controlled output 201 occurs when switch 202 is open, diodes 204-206 permit any of the other controlled output sections to contribute power to regulator 204. Thus only one of "N" switches need be open to permit power stealing via regulator 204. In the rare case that all switches are closed, a battery can power +V 111 until at least one of the switches opens.

FIG. 3 shows how a typical thermostat 315 can control a plurality of system devices. In this example, the terminals power system devices via AC controls following conventions of the art including terminals, "G" 104, fan motor control 110; "W" 306, furnace control 310; "Y" 307, compressor control 311; "Out1" 308, load control 312; and "Out2" 313, load control 2 313. AC power source 109 powers the AC controls via switches 202 and 302-305. As in the previous diagrams, thermostat electronics 315 can be referenced to electronics common 106 connected to terminal R in the AC circuit. It can be seen in this diagram that a more conventional DC power supply could be built using AC common terminal "C" 314 if it is available at the thermostat. But, most traditional HVAC control systems do not wire the AC common "C" back to the thermostat, thus there is a need for improved power stealing techniques.

Example

Figure 4:
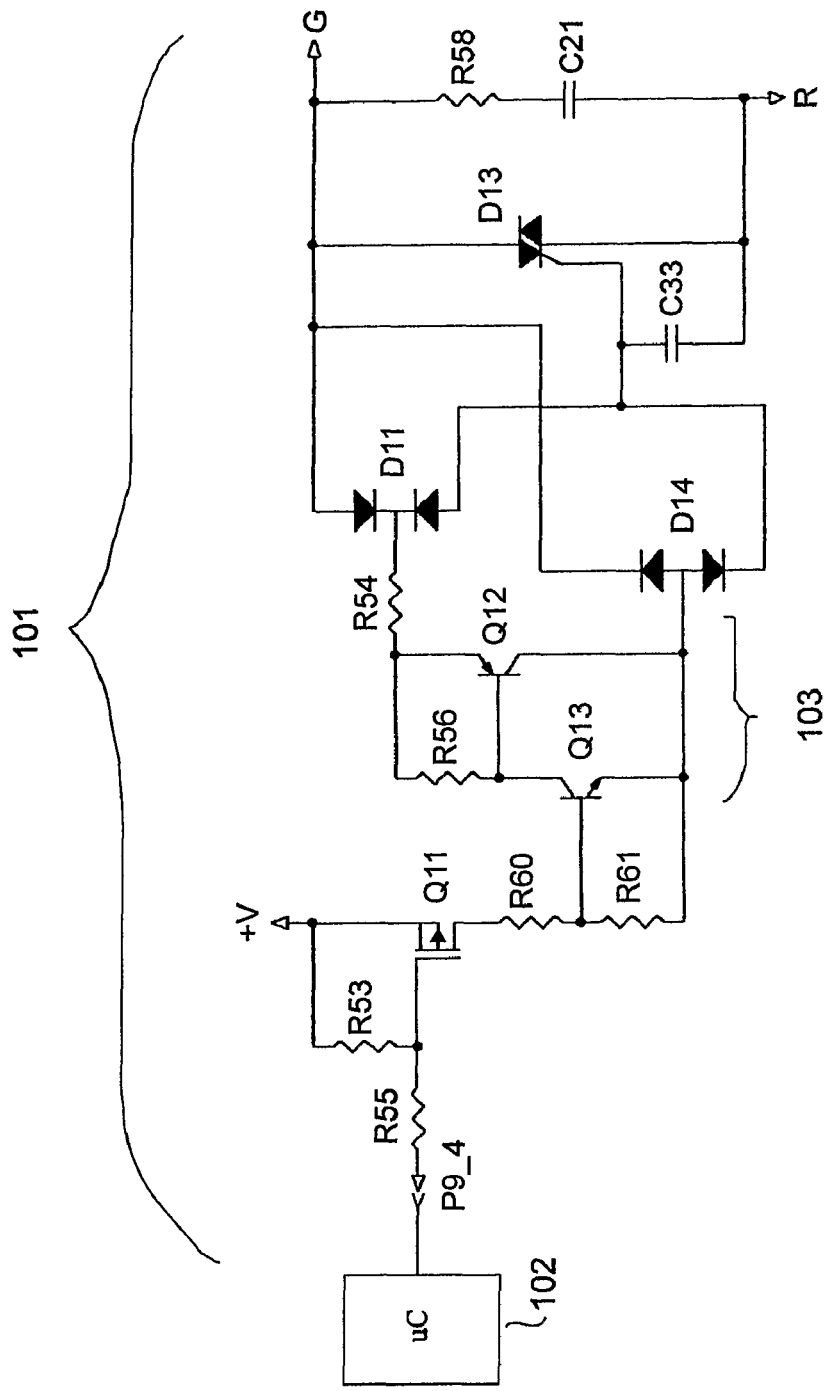
FIG. 4 shows an exemplary embodiment of the inventive circuit topology.

FIG. 4 shows an advantageous embodiment of the inventive circuit topology 101 of FIG. 1. It is to be understood that these component values and component types are merely exemplary values and types that were used in a particular embodiment of the inventive circuit topology. For example, any suitable P channel enhancement mode FET can be used as Q11, or any suitable NPN or PNP transistors can be used as Q12 and Q13. Similarly, the values of resistors and capacitors can be varied in other embodiments.

It is to be noted that a particular embodiment of the exemplary output circuit topology 101 of FIG. 4 has the following component values:

Q11 BSS84, P channel enhancement mode FET

Q13 MMBTA05LT1

Q12 MMBTA55LT1

D11 MMBD1204

D14 MMBD1205

D13 T405-600B

R53 2.2 Meg Ohms

R54 2.2 kilo Ohms

R55 1 Meg Ohms

R60 100 kilo Ohms

R61 150 kilo Ohms

R56 4.7 kilo Ohms

R58 150 Ohms

C21, C33 0.1 micro Farads

The operation of the circuit of FIG. 4 when the components have the particular values as set forth above will now be described. The improved power stealing circuit topology 101 comprises FET Q11 coupled to a PC 102 output control line "P9_4". When P9_4 is "HIGH" or logic level 1, the potential near +V causes the gate-source voltage of Q11 to be above a level that turns Q11 on, therefore both the gate and drain current are near zero. When μC 102 output control line P9_4 goes "LO" or to logic level 0, a very small current, typically on the order of nano Amps, flows through R53 and R55 causing a Q11 gate-source voltage that turns Q11 on. Once on, a current on the order of tens of microamps flows through R60, R61, and the base of Q13, turning on composite Darlington transistor amplifier switch 103. Amplifier switch 103, comprising Q13, Q12, and resistors R56 and R54, conducts causing a DC current in the DC connection to the bridge comprising dual diode packages D11 and D14 (equivalent to the FIG. 1 diode bridge comprising diodes D1-D4). The DC current flow in the bridge causes an AC current to flow through the bridge AC connection from terminal G to the gate of TRIAC D13, thus energizing TRIAC D13 and the corresponding AC control connected to terminal G. As previously discussed, a typical electronic thermostat comprises a plurality of output control circuits 101.

Figure 5:
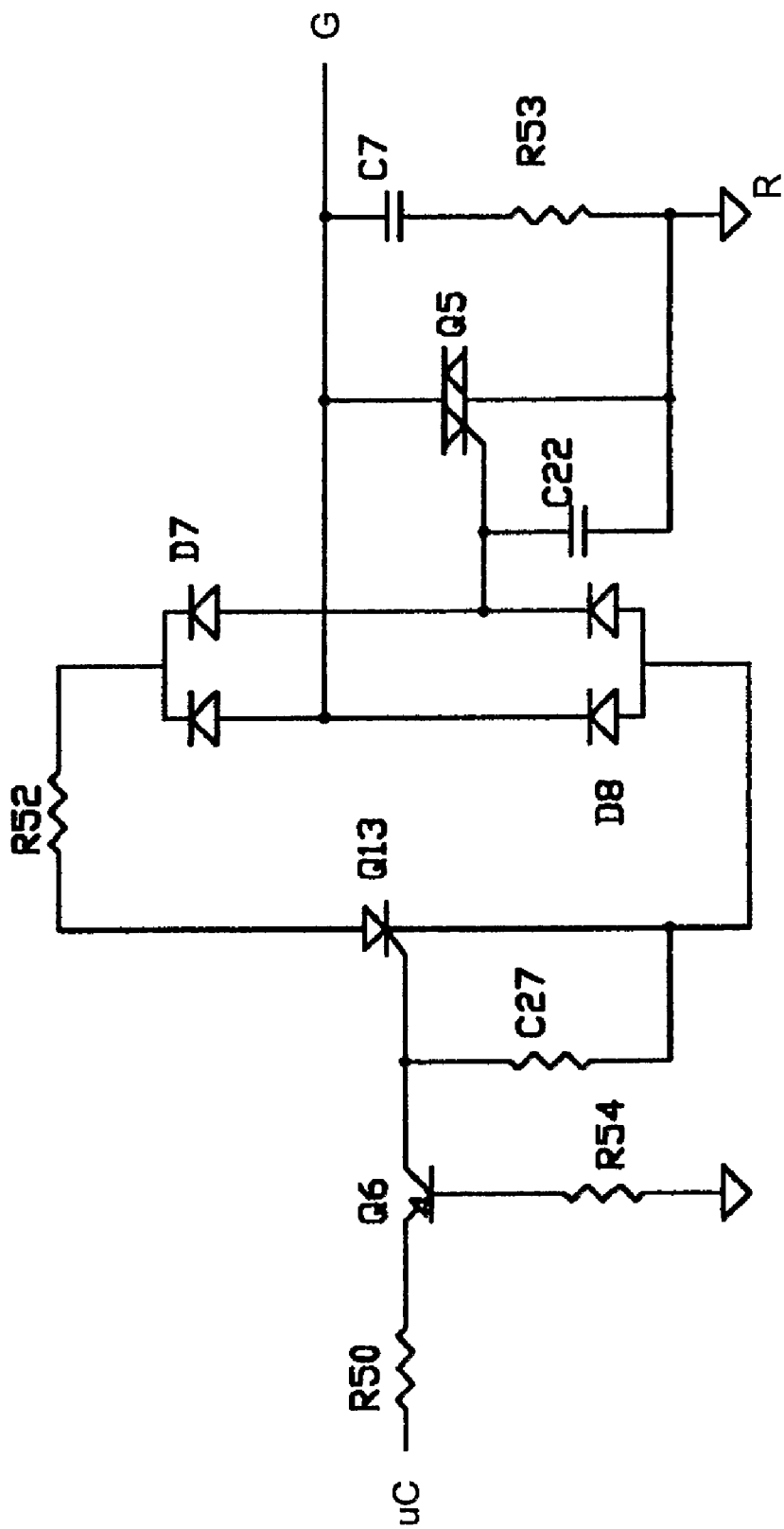
FIG. 5 is a schematic diagram of output circuit with high current load (prior art).

It can now be seen that each thermostat output circuit 101 of the improved circuit topology draws only tens of microamps at most from supply +V. This is particularly advantageous because +V is supplied by a combination of power stealing and battery power. Since many thermostats use non-rechargeable batteries it is important to minimize the power drawn by each output circuit 101. (By contrast, FIG. 5 shows an output circuit topology where control currents, and thus loading is far higher on the order of milliamps.) Moreover, if too much power is drawn by power stealing, one or more AC controls might be inadvertently activated by power stealing, rather than an actual "ON" command.

It should be noted that while the exemplary circuits show Q1 or Q11 as a "P channel" enhancement mode FET in a high side switch configuration, the connection to a microcontroller output could also be accomplished by a low side isolated gate "N channel" FET using a pull up resistor. Current saving performance may be different in embodiments using an N channel switch.

We claim:

1. An electronic thermostat circuit with improved power stealing for controlling an AC control device, said circuit comprising:
    a source of AC control power coupled to an electronic switch means having an electronic switch means control input, the electronic switch means for controlling the AC control device;
    a diode bridge means, the diode bridge having an AC connection and a DC connection, the AC connection electrically coupled to the electronic switch means control input, the diode bridge for controlling the electronic switch means by a DC control signal applied to the diode bridge means DC connection;
    an amplifier means having an on state and an off state, the amplifier means electrically coupled to the diode bridge means DC connection, the amplifier means having an amplifier input for controlling the state of the amplifier and an amplifier output for generating the DC control signal;
    an isolated gate FET means electrically coupled to the amplifier input for controlling the state of the amplifier, the isolated gate FET means further electrically coupled to a digital input signal, the digital input signal controlling the state of the DC amplifier means, the isolated gate FET means powered by the current derived from the source of AC control power by power stealing;
    wherein the digital signal controls the state of the AC control.

2. The thermostat of claim 1 wherein the electronic switch means comprises a TRIAC.

3. The thermostat of claim 1 wherein the FET means comprises an enhancement mode P channel or an enhancement mode N channel FET.

4. The thermostat of claim 1 wherein the amplifier means comprises a composite Darlington amplifier.

5. The thermostat of claim 1 wherein the digital input signal is generated by a microcontroller.

6. The thermostat of claim 1 wherein the AC control device is selected from the group consisting of a solenoid, a relay, and a solid state AC switch.

7. The thermostat of claim 1 wherein the isolated gate FET means power steals less than one milli Amp.

8. An HVAC system including an electronic thermostat circuit with improved power stealing requirements to control an AC control device, said circuit comprising:
    a source of AC control power coupled to an electronic switch having an electronic switch control input to control the AC control device;
    a diode bridge, the diode bridge having an AC connection and a DC connection, the AC connection electrically coupled to the electronic switch control input, the diode bridge for controlling the electronic switch by a DC control signal applied to the diode bridge means DC connection;
    an amplifier having an on state and an off state, the amplifier means electrically coupled to the diode bridge DC connection, the amplifier having an amplifier input for controlling the state of the amplifier and an amplifier output for generating the DC control signal;
    an isolated gate FET electrically coupled to the DC amplifier input to control the state of the amplifier, the FET further electrically coupled to a digital input signal, the digital input signal controlling the state of the DC amplifier, the digital signal controlling the state of the AC control;
    wherein the FET is powered by a power stealing circuit, the power stealing circuit deriving DC current from the source of AC control power, the FET drawing current from the power stealing circuit.

9. The thermostat of claim 8 wherein the electronic switch comprises a TRIAC.

10. The thermostat of claim 8 wherein the FET comprises an enhancement mode P channel or an enhancement mode N channel FET.

11. The thermostat of claim 8 wherein the amplifier comprises a composite Darlington amplifier.

12. The thermostat of claim 8 wherein the digital input signal is generated by a microcontroller.

13. The thermostat of claim 8 wherein the AC control device is selected from the group consisting of a solenoid, a relay, and a solid state AC switch.

14. The thermostat of claim 8 wherein the FET power steals less than one milli Amp.

* * * * *